No. 864,014. PATENTED AUG. 20, 1907.
J. D. MAXWELL.
UNIVERSAL JOINT.
APPLICATION FILED DEC. 31, 1904.
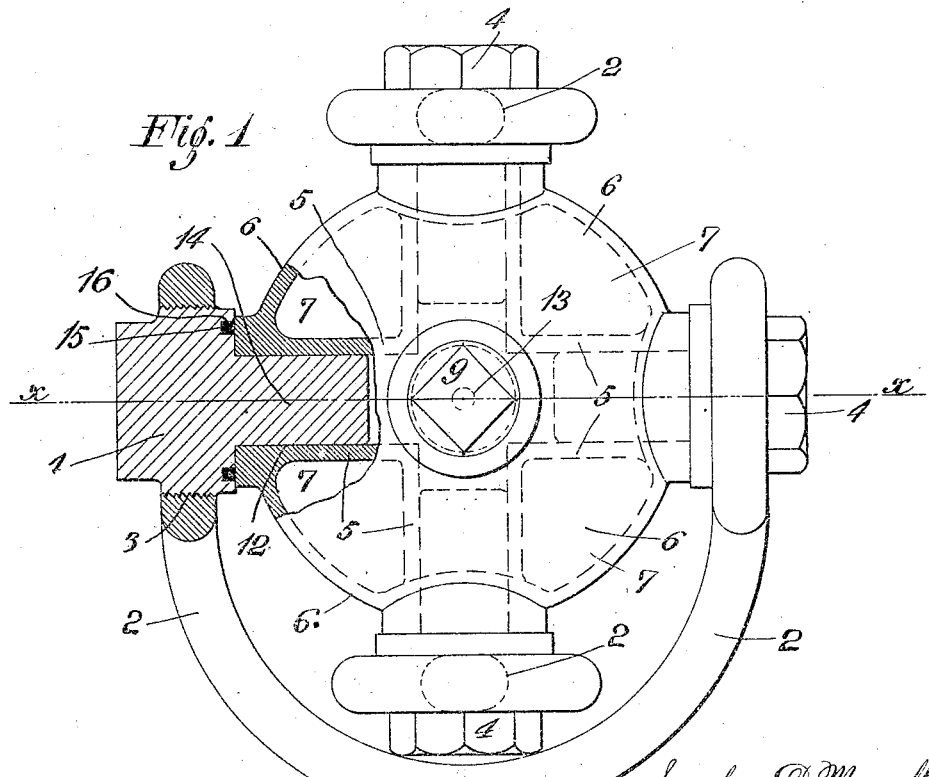

UNITED STATES PATENT OFFICE.

JONATHAN D. MAXWELL, OF TARRYTOWN, NEW YORK, ASSIGNOR TO MAXWELL BRISCOE MOTOR COMPANY, OF NORTH TARRYTOWN, NEW YORK, A CORPORATION OF NEW YORK.

UNIVERSAL JOINT.

No. 864,014.  Specification of Letters Patent.  Patented Aug. 20, 1907.

Application filed December 31, 1904. Serial No. 239,159.

*To all whom it may concern:*

Be it known that I, JONATHAN D. MAXWELL, of Tarrytown, New York, have invented certain Improvements in Universal Joints, of which the following description, in connection with the accompanying drawings, is a specification, like letters on the drawings designating like parts.

This invention relates to universal joints, and is particularly adapted for use in joints for power transmitting shafts, although I contemplate utilization of my improvements in any field to which they are adapted by reason of their nature.

The object of my invention is to provide a joint of compact form with means to enable provision therein for a supply of oil in much greater quantity than can be furnished by the forms of oilers now in use for such joints, my improvements doing away with the necessity for extraneous oil cups or oil channels which are liable to clog up with dust etc., the oil in my improved joint being contained within the cross of the joint and applied directly to the regions requiring it, in an adequate supply, but also in economical quantities.

My invention includes also means to prevent escape of the oil from the joint and to prevent access of dust to the bearing.

The various features of my invention will be illustrated and described fully in the accompanying drawings and specification and pointed out in the claims.

In the drawings, Figure 1 is a plan view of a universal joint in the construction of which my improvements have been embodied, parts being broken away to illustrate details of construction; and Fig. 2 is a vertical sectional view of the cross of the joint, separately, on the line $x$—$x$ Fig. 1.

In the embodiment of my invention selected for illustration and description as a convenient form to enable ready and complete understanding of my improvements, the reference numeral 1 designates one member of a power transmitting shaft, with the usual forked arms 2 having threaded sockets 3 in which are screwed pins 4 to coöperate with the cross member. As there is in the instance illustrated an exactly similar power transmitting member applied to the cross member at right angles to member 1, I have placed thereon, in the drawings, the same reference numerals to designate the corresponding parts which appear in the drawing.

In accordance with my invention, the cross proper, the respective arms of which are designated in the drawings by the reference numeral 5, is surrounded by a shell 6 which may be of any convenient form, but in the instance illustrated is shown as an oblate spheroid in which are formed relatively large chambers 7, the latter serving as receptacles for a large supply of oil and preferably being in communication with each other.

To permit introduction of the supply of oil or other lubricant a mouth 8 is provided, with a removable screw plug 9, a similar mouth 10 being provided on the opposite side of the shell if desired, and having a plug 11 which may be made removable or not as desired.

To give access of the oil contained in the chambers 7 to the bearings 12 in the cross, holes 13 are drilled or otherwise formed in the material of the cross as illustrated at 13, or otherwise as found suitable and convenient. When constructed as above, the chambers 7 having been filled with oil, and the shaft containing the joint put in operation, the centrifugal force will cause the larger portion of the oil to seek the periphery of the sphere, but sufficient will find its way through the aperture 13 to the central space or feed chamber formed by the intersection of the continuous cross bearings 12, to supply them amply and lubricate the members 14 of the pins 4, this supply being re-inforced by larger quantities when the shaft is stopped and the centrifugal action ceases.

To prevent escape of the oil at the head of the pins, and also to exclude dust from the bearings, I have shown the heads of the pins as provided at 15 with a groove containing a washer 16 of felt or other suitable packing material.

Having thus described my invention, and means by which the same may be carried into effect, I wish it understood that I do not limit myself to any specific material or shape, in its construction, except as set forth in the claims read in connection with this specification.

What I claim and desire to secure by Letters Patent is:—

1. In a cross for universal joints, a member having continuous cross pivot bearings of uniform diameter throughout and provided with chambers surrounding said bearings to receive lubricant, said bearings forming at their intersection a feed chamber through which lubricant is fed from said surrounding supply chambers uniformly to the peripheries of the pivots.

2. In a device of the class described, a cross having pivot bearings in its arms, comprising bores of uniform diameter intersecting to form a central feed chamber, a supply chamber formed in the material of said cross surrounding said bearings to receive lubricant and having a centrally situated feed aperture of relatively small diameter to feed the same gradually to said feed chamber and thence uniformly to the peripheries of the pivots lying in said bearings, substantially as described.

3. In a device of the class described, a cross having bearings in its arms, and a shell inclosing said arms and a central feed chamber, with a supply chamber to receive lubricant and feed the same gradually to said feed chamber when said device is at rest, and thence to said bearings, substantially as described.

4. A cross for universal joints, said cross consisting of an integral member having bearings comprising arms with continuous bearing bores forming a feed chamber at their intersection, and a coöperating oil supply chamber, substantially as described.

5. A device of the class described, comprising an integral structure in the form of an oblate spheroid, having equatorial cross-bearings, and chambered to receive lubricant, substantially as described.

6. A device of the class described comprising a spheroidal structure having connected equatorial cross-bearings, and otherwise hollow to receive lubricant, substantially as described.

7. A cross of the class described, having pivot bearings with exterior plane bearing faces adjacent the mouths of the bearings proper, combined with pivot pins having heads threaded to engage and be supported by a yoke and with bearing faces to coöperate with said cross-bearing faces, and a packing of felt or the like intermediate said cross and pivot faces to prevent escape of oil or ingress of dust, substantially as described.

8. A pivot pin for joints of the class described, said pin having a head with an undercut groove to receive a packing, the exterior of said head being threaded to engage and be supported by a yoke, substantially as described.

Signed at 25 Broad st., New York city, in the county of New York and State of New York, this twenty-ninth day of December, A. D. 1904.

JONATHAN D. MAXWELL.

Witnesses:
ALEXANDER C. PROUDFIT,
ROBT. G. JEFFERY.